United States Patent [19]

Austin et al.

[11] Patent Number: 5,866,012

[45] Date of Patent: Feb. 2, 1999

[54] MULTIFUNCTIONAL MALEATE POLYMERS

[75] Inventors: Anne-Marie B. Austin, Signal Mountain; James H. Belcher, deceased, late of Chattanooga, by Ted Betts, excecutor; Allen M. Carrier, Hixson, all of Tenn.; Michael L. Standish, Rossville, Ga.

[73] Assignee: National Starch and Chemical Investment Holding Corporation, Wilmington, Del.

[21] Appl. No.: 885,541

[22] Filed: Jun. 30, 1997

Related U.S. Application Data

[63] Continuation-in-part of Ser. No. 446,270, May 22, 1995, abandoned, which is a continuation of Ser. No. 322,658, Oct. 12, 1994, which is a continuation-in-part of Ser. No. 9,164, Jan. 26, 1993, abandoned.

[51] Int. Cl.$^6$ .................................................. C02F 5/12
[52] U.S. Cl. .......................................... 210/701; 252/180
[58] Field of Search ..................... 210/698–701; 252/174.24, 174.23, DIG. 2, 174.14, 174.25, 180, 181

[56] References Cited

U.S. PATENT DOCUMENTS

| | | | |
|---|---|---|---|
| 2,971,939 | 2/1961 | Baer | 260/45.5 |
| 3,635,915 | 1/1972 | Gale | 260/78.5 |
| 3,887,480 | 6/1975 | Rue et al. | 252/135 |
| 4,126,549 | 11/1978 | Jones et al. | 210/701 |
| 4,223,120 | 9/1980 | Kurowsky | 210/701 |
| 4,314,044 | 2/1982 | Hughes et al. | 260/29.6 M |
| 4,457,847 | 7/1984 | Lorenc et al. | 210/698 |
| 4,486,581 | 12/1984 | Walinsky | 526/271 |
| 4,519,920 | 5/1985 | Fukumoto | 210/701 |
| 4,559,159 | 12/1985 | Denzinger et al. | 252/174.24 |
| 4,586,962 | 5/1986 | Barabas | 134/4 |
| 4,647,396 | 3/1987 | Denzinger et al. | 252/174.24 |
| 4,659,793 | 4/1987 | Yang | 526/91 |
| 4,663,071 | 5/1987 | Bush et al. | 252/174.19 |
| 4,666,609 | 5/1987 | Tsuneki et al. | 210/701 |
| 4,668,735 | 5/1987 | Fukumoto et al. | 524/804 |
| 4,673,508 | 6/1987 | Coleman et al. | 210/701 |
| 4,710,537 | 12/1987 | Walinsky | 524/549 |
| 4,740,314 | 4/1988 | Kneller | 210/701 |
| 4,906,397 | 3/1990 | Leighton et al. | 252/174.24 |
| 4,952,324 | 8/1990 | McDonald et al. | 210/697 |
| 4,973,409 | 11/1990 | Cook | 210/701 |
| 5,021,525 | 6/1991 | Montague et al. | 526/210 |
| 5,055,540 | 10/1991 | Hughes et al. | 526/318.2 |
| 5,064,563 | 11/1991 | Yamaguchi et al. | 252/174.23 |
| 5,073,269 | 12/1991 | Denzinger et al. | 210/698 |
| 5,135,661 | 8/1992 | Patel | 210/698 |
| 5,135,677 | 8/1992 | Yamaguchi et al. | 252/180 |
| 5,149,455 | 9/1992 | Jacobs et al. | 252/174.13 |
| 5,160,657 | 11/1992 | Bortolotti et al. | 252/174.14 |
| 5,164,108 | 11/1992 | Appel et al. | 252/174 |
| 5,175,361 | 12/1992 | Denzinger et al. | 562/590 |
| 5,244,988 | 9/1993 | Hughes et al. | 526/93 |
| 5,320,757 | 6/1994 | Zidovec et al. | 210/701 |
| 5,601,723 | 2/1997 | Kirk et al. | 210/701 |

FOREIGN PATENT DOCUMENTS

| | | |
|---|---|---|
| 1277088 | 11/1990 | Canada . |
| 25 551 | 3/1981 | European Pat. Off. . |
| 59-68563 | 4/1984 | Japan . |
| PCT/EP94/00006 | 5/1995 | WIPO . |

Primary Examiner—Peter A. Hruskoci
Attorney, Agent, or Firm—John D. Thallemer

[57] ABSTRACT

The water-treatment processes of this invention utilize maleate copolymers to sequester water hardness ions, modify crystal formation in water and inhibit scale formation (e.g., in circulating water systems and oil field production systems), which polymers contain from about 40 to 70 mole percent of dicarboxylic functionality provided by a maleate monomer upon polymerization, from about 1 to about 15 mole percent of the polymerized residue of a non-ionic monomer, and from about 20 to about 50 mole percent of monocarboxylic functionality.

2 Claims, 4 Drawing Sheets

MULTIFUNCTIONAL MALEATE POLYMERS

This application is a continuation-in-part of application Ser. No. 08/446,270, filed May 22, 1995 now abandoned, which is a continuation application of Ser. No. 08/322,658, filed Oct. 12, 1994, which is a continuation-in-part of application Ser. No. 08/009,164, filed Jan. 26, 1993, now abandoned.

FIELD OF THE INVENTION

The invention relates to methods of treating aqueous systems to inhibit scale formation and to sequester water-hardness ions.

BACKGROUND OF THE INVENTION

It is known that maleic acid in aqueous solutions does not readily form homopolymers, but will quite rapidly copolymerize with various other ethylenically unsaturated monomers, typically to form 1:1 molar ratio maleate-:comonomer copolymers.

In most cases, maleate copolymers are prepared by a solution polymerization process employing organic solvents. For example, U.S. Pat. No. 4,710,537, issued Dec. 1, 1987 to Walinsky, teaches the preparation of a substantially homogeneous copolymer, consisting essentially of 35 to 65 mole percent acrylate and 65 to 35 mole percent maleate units and having a number average molecular weight of about 500 to 5,000. The copolymer is prepared in a chain-transfer solvent, preferably a ketone, ester, or ether having from 4 to 10 carbon atoms. Following polymerization, an aqueous solution of the copolymer may be prepared by adding water to the polymerization flask and distilling off the organic solvent.

For reasons of safety, efficiency in manufacturing and waste handling, it is desirable to polymerize the maleate copolymers in aqueous solution, rather than in organic solvent. An aqueous solution preparation of maleate copolymers is disclosed in Japanese Patent Application JP 60-212,410, published Oct. 24, 1985 by Fukumoto, et al. The polymerization method provides maleate copolymers with mean molecular weights of 300 to 5,000 and has a reported "polymerization rate" of, at most, 96.2%. The "polymerization rate" is the difference between the weight of monomer initially charged and the weight of copolymer recovered following polymerization (i.e., a measure of the unreacted residual monomer).

Another method for preparation of maleate copolymers in aqueous solution is disclosed in U.S. Pat. No. 4,519,920, issued May 28, 1985, to Fukumoto, et al. This process provides an initial, partial neutralization of the maleate monomer with alkali. A similar aqueous solution process for producing a polymaleate, with an option to copolymerize up to 20 mole percent of an unsaturated carboxylic acid comonomer, is disclosed in U.S. Pat. No. 4,668,735, issued May 26, 1987, to Fukumoto, et al.

U.S. Pat. No. 3,635,915, issued Jan. 18, 1972 to Gale discloses a process for preparing maleate/acrylate copolymers in aqueous solution using an inorganic peracid salt as a catalyst. The copolymers are prepared from 50 to 95 parts of acrylic acid and 5 to 50 parts of maleic acid, on a monomer weight basis (i.e., 57.5 to 96.5 mole percent acrylate and 3.5 to 42.5 mole percent maleate).

U.S. Pat. No. 4,659,793, issued Apr. 21, 1987, to Yang claims an aqueous polymerization process for manufacturing copolymer having a low residual free monomer content from carboxylic acid monomers and various comonomers. In the claimed process a metallic ion redox catalyst is used to prepare a copolymer comprising 25 to 55 weight percent (i.e., 21 to 47 mole percent) dicarboxylic acid monomer.

U.S. Pat. No. 4,314,044, issued Feb. 2, 1982 to Hughes, et al., claims an aqueous polymerization process for manufacturing copolymers of carboxylic acid monomers using a metallic ion redox catalyst system. As exemplified in the patent, the process only achieves about 95% monomer conversion. About 5 to 50 weight percent dicarboxylic acid is polymerized in the claimed process.

We have now discovered that an aqueous solution polymerization, employing a combination of at least 50 mole percent, preferably at least 70 mole percent charge preneutralization of the maleate monomer, a redox initiator catalyst using metallic ion, a slow feed addition of at least one comonomer, preferably over a period of at least three hours, to the neutralized maleate monomer and a post-feed of a polymerization initiator provides a copolymer having a weight average molecular weight of about 1,000 to 4,000, comprising less than 1%, on a copolymer weight basis, of residual, free monomer. This process may be carried out under ambient atmospheric conditions. An inert atmosphere, such as nitrogen, is not required for the polymerization. The resulting copolymer is useful as an antiscalent, an anti-incrustation agent, a dispersant, a sequestrant and a water hardness salt (e.g., calcium carbonate, magnesium carbonate, magnesium sulfate, magnesium hydroxide, calcium sulfate, calcium silicate, magnesium silicate and barium sulfate) crystal modifier. The maleate copolymers of this invention are preferably prepared by an aqueous solution polymerization process and may be used to sequester water hardness ions, modify crystal formation in water and inhibit scale formation (e.g., in circulating water systems and oil field production systems). The maleate copolymer comprises from about 40 to 70 mole percent of dicarboxylic functionality provided by a maleate monomer upon polymerization, for instance maleic acid, from about 1 to about 15 mole percent of the polymerized residue of a non-ionic monomer, e.g. acrylamide or vinyl acetate, and from about 20 to about 50 mole percent of monocarboxylic functionality, provided either by a carboxylic acid, containing at least one activated carbon-to-carbon olefinic double bond and at least one carboxyl group, upon polymerization with the maleate monomer and the non-ionic monomer, or generated in-situ by hydrolysis of one of the non-ionic monomers which is hydrolyzable under acidic or basic pH conditions, for example acrylamide.

SUMMARY OF THE INVENTION

The maleate copolymers of this invention are preferably prepared by an aqueous solution polymerization process and may be used to sequester water hardness ions, modify crystal formation in water and inhibit scale formation (e.g., in circulating water systems and oil field production systems). The maleate copolymer comprises from about 40 to about 70 mole percent of dicarboxylic functionality provided by a maleate monomer upon polymerization, for instance maleic acid or maleic anhydride, from about 1 to about 15 mole percent of the polymerized residue of a non-ionic monomer, e.g. acrylamide or vinyl acetate, and from about 20 to about 50 mole percent of monocarboxylic functionality, provided either by a carboxylic acid containing at least one activated carbon-to-carbon olefinic double bond and at least one carboxyl group, upon polymerization with the maleate monomer and the non-ionic monomer, or generated in-situ by hydrolysis of one of the non-ionic monomers which is hydrolyzable under basic or acidic pH conditions, e.g. acrylamide. The maleate copolymer has a weight average molecular weight of about 1,000 to 4,000, as determined by gel permeation chromatography methods set forth herein.

BRIEF DESCRIPTION OF THE DRAWINGS

The capacity of the maleate copolymers of this invention to modify water hardness salt crystal formation is illustrated in FIGS. 1–4 herein.

FIGS. 4 illustrates the crystal modification properties of a maleate terpolymer of this invention (prepared from maleic acid, acrylic acid and acrylamide monomers). FIGS. 1–3 illustrate the properties of three comparative polymers The samples and testing methods are set forth in Example 2, below.

DESCRIPTION OF THE PREFERRED EMBODIMENTS

In the process for preparing the copolymers of this invention, an aqueous solution comprising 40 to 70 mole %, preferably comprising 45 to 65 mole %, by weight, of maleate monomer is prepared. Suitable maleate monomers include maleic acid, maleic anhydride, alkali metal maleate salts, ammonium maleate salts, and mixtures thereof.

In the initial step of the process, the aqueous maleate solution is neutralized by the addition of alkali. Each mole of maleate comprises two moles of carboxylic acid charge. Thus, two moles of alkali are required for each mole of maleate monomer to provide 100% charge neutralization of the monomer. For the purposes of this invention, at least 50% of the carboxylic acid charge on the maleate monomer is neutralized prior to polymerization. In certain preferred embodiments, at least 70% of the carboxylic acid charge, more preferably at least 80%, must be neutralized prior to polymerization. Any base may be used for this step. In a preferred embodiment, an aqueous solution of an alkali metal hydroxide, such as sodium or potassium hydroxide or an aqueous ammonium solution is added to the maleate monomer solution.

The polymerization is carried out at 80° to 180° C., preferably 90° to 100° C., and most preferably, 95° to 100° C., under reflux. If the temperature is permitted to remain below 90° C., the neutralized maleate salt is likely to precipitate out of the reaction solution. If a relatively labile comonomer, such as acrylamide, is used, then monomer will be lost at temperatures exceeding 100° C. and it is preferred to maintain the temperature below 100° C. The reflux may be carried out under ambient atmosphere or under inert atmosphere, such as nitrogen. Likewise, the reaction may be carried out under greater than atmospheric pressure (e.g., ½ to 1½ atmospheres), although ordinary atmospheric conditions are suitable and are preferred.

The process employs as a polymerization initiator a redox system, comprising at least one initiator and at least one metallic ion suitable for use as a reductant in a redox catalyst system. Such reducing cations include the metallic ions obtained from iron, zinc, cobalt, molybdenum, chromium, nickel, vanadium and cerium, and combinations thereof. Preferred metallic ions are obtained from ferrous ammonium sulfate, ferrous sulfate, ferrous chloride, cobalt salts (e.g., cobalt sulfate hexahydrate), vanadium salts, and combinations thereof, and other water soluble salts producing metallic ions that are susceptible to oxidation by oxidants typically used in redox catalysts as polymerization initiators.

Such initiators include hydrogen peroxide, benzoyl peroxide, sodium persulfate and sodium persulfate bisulfite, t-butyl hydroperoxide, cumene hydroperoxide, dialkyl peroxide, ammonium persulfate and ammonium persulfate/bisulfite, and combinations thereof. A mixture of initiators is preferred. The initiator is preferably utilized at about 4 to 15%, on a total monomer mole basis, together with an effective amount of metallic ion, preferably at least 1 ppm, most preferably at least 4 ppm metallic ion, on a total batch weight basis. The initiator and metallic ion may be added to the initial maleate charge, or added with the feed of the comonomer(s), or both. A reductant, such as erythorbic acid or ascorbic acid is preferably added after polymerization.

In a preferred embodiment an initiator comprising, on a total monomer weight basis, 8 to 12% hydrogen peroxide and 3 to 5% sodium persulfate is added along with the comonomer(s) feed. A total of 3 to 18 ppm ferrous ammonium sulfate hexahydrate is added to the initial maleate charge. A total of 1 to 2% hydrogen peroxide and 0.25 to 0.35% sodium persulfate is added during the post-polymerization period.

The comonomers, either in aqueous solution or neat, are added slowly during polymerization over a period from about 3 to 10 hours. In a preferred embodiment, the comonomers are added, without prior neutralization, to the polymerization flask over the 3 to 10 hour period.

The copolymers utilized in processes of the present invention comprise randomly repeating units as represented by the following structures, at the respective molar ratio.

where X=40–70 mole percent, Y=20–50 mole percent, Z=1–15 mole percent, M is selected from the group consisting of an alkali metal, an alkaline earth metal, ammonium or hydrogen, $R^1$, $R^2$, and $R^3$ are hydrogen, hydroxyl, $C_1$–$C_4$ alkyl, aryl, aralkyl, alkaryl or cycloaliphatic radical, and A is where $R^4$ and $R^5$ are selected from the group consisting of hydrogen, $C_1$–$C_4$ alkyl and methylol.

The carboxylic acid monomers useful in the production of the polymers of this invention are the olefinically unsaturated carboxylic acids containing at least one activated carbon-to-carbon olefinic double bond, and at least one carboxyl group; that is, an acid containing an olefinic double bond which readily functions in polymerization because of its presence in the monomer molecule either in the α-β position with respect to a carboxyl group, or as a part of a terminal methylene grouping. Suitable carboxylic acid comonomers include ethylenically unsaturated monocarboxylic acids, preferably acrylic acid, and, optionally, other copolymerizable comonomers. Preferred monocarboxylic acid monomers include acrylic acid, methacrylic acid and ethacrylic acid, and combinations thereof (the "acrylic" monomer).

Useful olefinically-unsaturated acids of this class include such widely divergent materials as the acrylic acid comonomers typified by acrylic acid itself, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, citraconic acid, mesaconic acid, glutaconic acid, aconitic acid, fumaric acid, and tricarboxy ethylene. For the polycarboxylic acid monomers, an anhydride group is formed by the elimination of one molecule of water from two carboxyl groups located on the same polycarboxylic acid molecule. The preferred carboxylic monomers for use in this invention are the monoolefinic acrylic acids having a substituent selected from the class consisting of hydrogen, halogen and hydroxyl groups, monovalent alkyl radicals, monovalent aryl radicals, monovalent aralkyl radicals, monovalent alkaryl radicals and monovalent cycloaliphatic radicals.

It is possible to generate the copolymer with the required levels of maleate functionality, non-ionic functionality and the monocarboxylic functionality in-situ from copolymers prepared only from the maleate monomer and a non-ionic monomer which is hydrolyzable under basic or acidic pH conditions, thereby generating the monocarboxylic functionality otherwise provided to the polymer by the olefinically unsaturated carboxylic acids containing at least one activated carbon-to-carbon olefinic double bond, and at least one carboxyl group. For example, copolymers prepared from about 50/50 molar ratio of maleic acid and acrylamide monomers are hydrolyzed under basic or acidic conditions to form a copolymer comprising functionality from the maleate monomer and the acrylamide monomer, in addition to monocarboxylic acid functionality. Accordingly, the polymer added to the aqueous system may be a copolymer of the maleate monomer and the "hydrolyzable" nonionic monomer. It is essential that the "hydrolyzable" nonionic monomer be present at levels sufficient to provide the required level of monocarboxylic acid functionality upon hydrolysis, as it has been determined that minimum amounts of monocarboxylic acid functionality must be present in order to provide the copolymers with the unique properties which they possess.

The copolymer may be a terpolymer of the maleate monomer, the carboxylic acid monomer and the non-ionic monomer. For example, when vinyl acetate is used as the non-ionic comonomer, hydrolysis to the monocarboxylic acid functionality does not take place and so the carboxylic acid monomer is required during polymerization. It is preferred to prepare the copolymers utilizing the three particular types of monomers, that is the maleate monomer, olefinically unsaturated carboxylic acids containing at least one activated carbon-to-carbon olefinic double bond, and at least one carboxyl group, and the non-ionic monomer.

Water soluble is defined herein to mean comonomers which have a minimum solubility of 5% by weight in water at 25° C. Such comonomers include acrylic and methacrylic acid; acrylamide, methacrylamide, acrylonitrile; N,N-dialkylaminoalkyl acrylates and methacrylates (wherein the alkyl group contains 1 to 4 carbon atoms); ethylenically unsaturated quaternary ammonium salts such as N,N,N-trimethylaminoethyl methacrylate methylsulfate or halide, 2-hydroxy-3-methacryloxypropyltrimethyl-ammonium methyl sulfate or halide, vinylbenzyltrialkylammonium methylsulfate or halide; sodium or ammonium styrenesulfonate; vinyl pyrrolidinone; hydroxyl alkyl acrylates and methacrylates; sodium 2-acrylamido-2-methylpropane sulfonate, etc. Various other water-soluble comonomers suitable for polymerization with maleate and acrylic monomers are known to those skilled in the art.

In preferred embodiments, the maleate copolymer is prepared with from about 40 to about 70 mole % of the maleate monomer, from about 20 to about 50 mole % of the olefinically unsaturated carboxylic acid containing at least one activated carbon-to-carbon olefinic double bond and at least one carboxyl group, and from about 1 to about 15 mole % of a non-ionic comonomer selected from the group consisting of acrylamide, methacrylamide, ethylacrylamide, propylacrylamide, isopropylacrylamide, N,N-dimethylacrylamide, N,N-diethylacrylamide, N,N-dipropylacrylamide, N-methylolacrylamide, t-butylacrylamide and vinyl acetate. In a preferred embodiment, the copolymer is prepared with from about 45 to about 65 mole percent maleate monomer, from about 30 to about 45 mole percent carboxylic acid monomer and from about 1 to about 10 mole percent non-ionic monomer.

The copolymers prepared by the process of this invention preferably have a weight average molecular weight of about 1,000 to 4,000. At these molecular weights, the copolymers of this invention exhibit improved performance in controlling water hardness, compared to higher molecular weight (e.g., 5,000–30,000) copolymers comprising maleate/acrylate monomers. The method for determining the weight average molecular weight ($M_w$) of the copolymers is set forth herein below.

The copolymers of this invention are characterized by an extremely low residual monomer content of less than about 1%, on a dry copolymer weight basis. In a preferred embodiment, the copolymers of this invention comprise no more than 0.25% residual monomer, on a copolymer dry weight basis. The percent residual monomer calculations are based on maleate monomer.

The copolymers of this invention are useful in quantities greater than 0.5 ppm, preferably at 1 to 100 ppm, most preferably 5 to 30 ppm, on a water weight basis, to control scale formation and sequester water hardness ions in water treatment applications. When the maleate copolymers were evaluated for modification of water hardness salts, copolymers comprising a third comonomer provided superior modification of salt crystal formation and much greater efficacy in controlling water hardness relative to commercially used polymers. The maleate copolymer is useful as a water treatment agent in boiler feed water, cooling water, air conditioning water, circulating water (for heating, cooling or maintaining temperature or for insulation), commercial water systems containing water hardness ions, manufacturing operations, and waste water treatment operations. Effective usage levels will depend upon the particular water system to be treated, salt concentration and other variables. The maleate copolymers may be used to treat water used in paper manufacturing, sugar manufacturing, oil field production (e.g., at 100 ppm to 0.5% of the water system) and other industrial applications requiring salt crystal modifications in aqueous solutions, slurries and dispersions.

Molecular Weight Analysis

The polymers were analyzed using aqueous gel permeation chromatography designed for water soluble linear polymers of acrylic acid. A ToyoSoda PWXL column bank, a differential refractometry detector and a 0.05M $NaH_2PO_4$ $H_2O+0.05M$ $Na_2HPO_4$ mobile phase are utilized, at a pressure of about 1,000 psi, a flow rate of 1.0 mL/min and a column temperature of 35° C. The calibration was performed with polyacrylic acid standards of known weight-average and number-average molecular weights. Unknown polymers were diluted to a concentration equivalent to that of the standards and subsequently analyzed under the conditions described above.

EXAMPLE 1

This example illustrates the process for preparing the copolymers of this invention.

Synthesis of the copolymers is described in Parts A–E, below. Copolymer characteristics are described in Table I, below.

ide solution (0.7 mole of base/mole of carboxylic acid charge of the maleate monomer, or 1.4 moles base/mole of maleate monomer). Based on monomer weight, 10.6 ppm ferrous ions (0.03 grams of ferrous ammonium sulfate hexahydrate), and 1.0 g isoascorbic acid were added to the flask.

At a reflux temperature of 98°–100° C., a feed containing 2.23 moles (160.6 grams) of acrylic acid and 0.25 moles acrylamide (34.0 g of a 52% aqueous solution) and 30.0 g of a 50% solution of sodium hydroxide in 130.0 grams of deionized water, and a second feed containing 11.8% (142 g) of hydrogen peroxide and 4.3% sodium persulfate (18 g in 104.5 water), on a total monomer weight basis, were added drop wise, with stirring, to the flask over a 5 hour, 15 minute period followed by a two hour cook.

Total solids, pH and intrinsic viscosity in 1N NaCl were recorded. The molecular weight was measured by gel per-

TABLE I

Copolymer Synthesis

| Copolymer Sample | Monomer[a] Molar Ratio | Degree of Pre-Neutralization of Maleate (mole %) | Final pH | Mw | Mn | Percent Residual Monomer[b] |
|---|---|---|---|---|---|---|
| Part A | | | | | | |
| 1 | MA/AA/AM 50/45/5 | 70 | 5.2 | 2522 | 1805 | <0.01 |
| 2 | MA/AA 60/40 | 80 | 5.7 | 2297 | 1555 | 0.1 |
| 3 | MA/AA 50/50 | 50 | 6.3 | 2672 | 1254 | <0.01 |
| Part B | | | | | | |
| 4 | MA/AA/AM 50/40/10 | 75 | 5.2 | 2367 | 1755 | 0.03 |
| 5 | MA/AA/AM 50/42/8 | 85 | 5.7 | 2203 | 1653 | <0.1 |
| 6 | MA/AA/AM 60/35/5 | 85 | 5.8 | 1786 | 1113 | 0.18 |
| 7 | MA/AA/AM 50/49/1 | 80 | 4.9 | 2700 | 1906 | <0.01 |
| 8 | MA/AA/AM 50/35/15 | 80 | 5.6 | 2830 | 1909 | 0.07 |
| Part C | | | | | | |
| 13 | MA/AA/AM 50/45/5 | 80 | 5.4 | 3063 | 2028 | <0.1 |
| Part D | | | | | | |
| 15 | MA/AM 70/30 | 50 | 5.8 | 2698 | 1643 | <0.01 |
| Part E | | | | | | |
| 16 | MA/AA 67/33 | 52.5 | — | 3600 | — | 2.1 (precipitated)[c] |
| Part F | | | | | | |
| 17 | MA/AA 67/33 | 52.5 | 5.2 | 3094 | 1938 | 0.40 |

[a]MA is maleic acid or anhydride; AA is acrylic acid; AM is acrylamide; and VA is vinyl acetate.
[b]For sample 13, monomer content was measured by gel permeation chromatography following polymerization. All other samples were measured using a liquid chromatograph.
[c]The residual monomer was present in sufficient quantity to precipitate from the polymerization solution. The precipitate was redissolved and analyzed by liquid chromatography. No final pH nor $M_n$ measurements were made.

Part A

Copolymer 1 (50/45/5 maleic/acrylic/acrylamide): A charge of 2.47 moles (242.0 grams) maleic anhydride in 350 grams of deionized water was placed into a flask equipped with two dropping funnels, a reflux condenser, a nitrogen inlet and a stirrer. The maleic anhydride was 70% neutralized by the addition of 276.6 grams of 50% sodium hydroxmeation chromatography using polyacrylate standards. The residual monomer (a total of maleic acid, acrylic acid and fumaric acid) was measured by liquid chromatography using a Waters Liquid Chromatograph apparatus.

Copolymer 2 (67/33 maleic/acrylic): A copolymer was synthesized as described above except: (1) 1.32 moles of maleic anhydride (129.4 grams) and 0.66 moles of acrylic acid (47.5 grams) were used, (2) the initiator charge comprised 10.8% hydrogen peroxide and 4.5% sodium persulfate, on a total monomer mole basis, (3) 5 ppm (on a total batch weight basis) ferrous ammonium sulfate hexahydrate, was added to the maleate monomer, (4) the feed time was 5 hours followed by a 20 minute initiator post feed and (5) a post treatment of 0.17%, on a monomer weight basis, of isoascorbic acid was added to the aqueous copolymer.

Copolymer 3 (50/50 maleic/acrylic): A copolymer was synthesized as described above, except: (1) a charge of 2.57 moles of maleic anhydride (251.5 g) in 400 g of deionized water 0.118 g ferrous ammonium sulfate hexahydrate, 150 g isopropanol, and 209.5 g of a 50% solution of sodium hydroxide, and a feed of 2.57 moles acrylic acid (184.8 g) and 104.4 g of a 50% solution of sodium hydroxide in 140.1 g of deionized water were used, (2), the maleate was 50% neutralized with base prior to polymerization, (3) comonomer feed was added over a 5 hour period, and an additional initiator (168.5 g of a 35% solution of hydrogen peroxide) feed was added simultaneously over a 6 hour period. Following the synthesis, 85 g of a 50% sodium hydroxide solution, was added to the flask and the copolymer was recovered in aqueous solution following distillation to remove isopropanol.

Part B

Copolymers 4–8 (maleic/acrylic/acrylamide): Copolymers were synthesized as described above except that the molar ratio of the monomers was varied.

Copolymer 4 was prepared from a molar ratio of 50/40/10 maleic/acrylic/acrylamide, using 2.57 moles maleic anhydride (251.9 g), 2.06 moles acrylic acid (148.3 g) and 0.51 moles acrylamide (69.6 g of a 52% solution). The initial charge included the maleate, 400.0 g of deionized water, 308.4 g of a 50% sodium hydroxide solution, 150.0 g isopropanol, 0.118 g of ferrous ammonium sulfate hexahydrate and 2.5 g of a 35% solution of hydrogen peroxide. The monomer feed contained 150.0 g of deionized water in addition to the acrylic acid and acrylamide. The initiator feed contained 183.0 g of hydrogen peroxide in 100.0 g of deionized water. Following synthesis, 250.0 g of 50% sodium hydroxide was added.

Copolymer 5 was prepared from a molar ratio of 50/42/8 maleic/acrylic/acrylamide, using 2.57 moles maleic anhydride (251.9 g), 2.14 moles acrylic acid (154.0 g, glacial) and 0.43 moles acrylamide (58.7 g, 52% solution). The initial charge contained the maleic anhydride, 362 g deionized water 349.5 g of 50% sodium hydroxide, and an initiator mixture of 0.03 g ferrous ammonium sulfate hexahydrate and 3.0 g of ethythorbic acid. The monomer feed contained the acrylic acid, acrylamide, 20.0 g of 50% sodium hydroxide and 175.0 g of deionized water. The initiator feed contained 1.42 moles of hydrogen peroxide (138.0 g of a 35% solution) and 0.122 moles of sodium persulfate (29 g in 116.5 g of deionized water). The monomer was added over 5 hours, the initiator over 5 hours and 15 minutes and synthesis was followed by a 2 hour cook.

Copolymer 6 was prepared from a molar ratio of 60/35/5 maleic/acrylic/acrylamide, using 3.08 moles maleic anhydride (301.8 g), 1.80 moles acrylic acid (129.6 g, glacial) and 0.25 moles acrylamide (34.2 g, 52% solution). The initial charge contained the same components as in copolymer 5 except sodium hydroxide was increased to 418.8 g and the water to 385.0 g. The monomer feed contained the monomers in 15.0 g of 50% sodium hydroxide and 120.0 g of water. The initiator feed contained 150.0 g of 35% hydrogen peroxide, and 35.0 g of sodium persulfate in 120.0 g of water.

Copolymer 7 was prepared from a molar ratio of 50/49/1 maleic/acrylic/acrylamide, using 1.23 moles maleic anhydride (121 g), 1.21 moles acrylic acid (87.1 g, glacial) and 0.025 moles acrylamide (3.5 g, 50% solution). The initial charge contained maleic anhydride, 175 g deionized water 158 g 50% sodium hydroxide, and 0.02 g of ferrous ammonium sulfate hexahydrate. The monomer feed contained 64.5 g of 35% hydrogen peroxide, and 9.5 g of sodium persulfate in 10 g deionized water.

Copolymer 8 was prepared from a molar ratio of 50/35/15 maleic/acrylic/acrylamide, using 1.23 moles maleic anhydride, (121 g), 0.863 moles acrylic acid (62.1 g, glacial) and 0.37 moles acrylamide (52.5 g of 50% solution). The initial charge contained the same components as Copolymer 7. The monomer feed contained the monomers in 45.0 g of deionized water. The initiator feed was the same as Copolymer 7.

Part C

Copolymers 13 and 14 (maleic/acrylic 50/45 and 5% third monomer): Copolymers 13 and 14 were synthesized as described above for copolymer 1, utilizing vinyl acetate and acrylamide as the non-ionic monomer, respectively.

Part D

Copolymer 15, a copolymer of maleic acid and acrylamide in a molar ratio of 70/30, was synthesized as described for copolymer 3, above, except no acrylic acid was used. While this polymer was identified in the parent case as a comparative polymer, it was tested only for detergent applications and was not evaluated in water-treatment applications claimed in this application. Accordingly, the polymer was comparative only for detergent applications, as the conditions for detergent and water-treatment applications claimed herein are different.

Part E

For comparative purposes, copolymer 16, a copolymer of maleic and acrylic acids in 67/33 molar ratio, was synthesized as described in Example 1 of U.S. Pat. No. 4,519,920 (the "Kao '920 patent"). In the Kao '920 synthesis, the initial maleate charge was only 52.5% neutralized with sodium hydroxide (a molar ratio of maleic anhydride/sodium hydroxide of 1.00/1.05). The Kao '920 synthesis also differed from the synthesis of copolymer 2 of this invention in that an additional 5.0% sodium hydroxide was added with the acrylic acid, only 9.55%, on a total monomer molar basis, of a single initiator (hydrogen peroxide) was used, and there was no initiator post-feed.

Part F

Copolymer 17, a copolymer of maleic and acrylic acids in 67/33 molar ratio, was synthesized as described for copolymer 2, above, except the maleic anhydride was 52.5% pre-neutralized and the initiator charge was increased to 15.5%, on a total monomer weight basis.

EXAMPLE 2

This example illustrates the efficacy of the copolymers of this invention in altering calcium crystal formation and inhibiting scale formation in water treatment systems.

Calcium carbonate crystal formation was tested by treating aqueous solutions of calcium carbonate (160 ppm $Ca^{++}$)

with a second batch of copolymer 1 of Table I ("copolymer 1A", Table II, was made using, as the initiator, 10.8% hydrogen peroxide, 4.5% sodium persulfate and 5.6% ferrous ion) and control polymers selected from commercial polyacrylate (molecular weight 2,600–3,000), acrylic acid/maleic acid 70/30 copolymer (molecular weight about 4,500), a 50/50 maleic/acrylic acid copolymer (Copolymer 3, Table I), a sulfonate styrene/maleic acid 3/1 molar ratio copolymer and a sulfonate styrene/maleic acid 1/1 mole ratio copolymer. For each polymer sample, 0.1% active polymer solution (3 mls; 30 ppm polymer) was added to a bottle containing 20 mls of 0.1M $Na_2CO_3$ and 30 mls of 0.1M $NaHCO_3$. Control blank samples were also prepared. One set of samples was equilibrated to 50° C. in a water batch and a matching set of samples was equilibrated to 70° C. Solutions of $CaCl_2$ were equilibrated to either 50° or 70° C. and a 50 ml aliquot (160 ppm Ca++) of $CaCl_2$ was added to each test bottle and the control bottle at the corresponding temperature. The bottles were inverted three times and left in the 50° and 70° C. water baths overnight. The calcium carbonate crystals that precipitated from these samples were examined by scanning electron microscopy.

A scanning electron microscope (J.E.O.L. Model JXA-6400, obtained from Japanese Electron Optical Ltd., Japan) set at 15 KV, with 2,000× magnification, was used to examine calcium carbonate crystals formed after treatment of calcium carbonate solutions with experimental and control polymer. Photomicrographs of various crystal formations were prepared.

Figure 1:
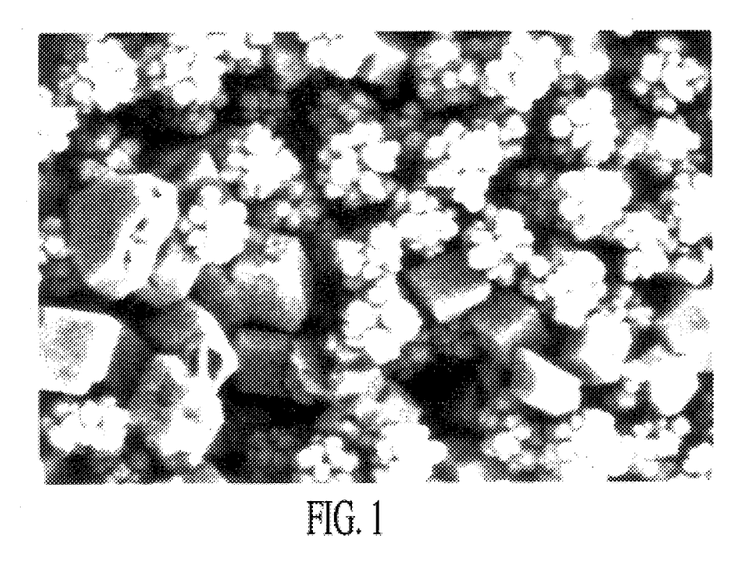
FIGS. 1–4 are photomicrographs of calcium carbonate crystals formed after treatment with the maleate copolymers and various comparative examples.

Photomicrographs of crystals treated with the Copolymer 1A (FIG. 4), the commercial polyacrylate obtained from Alco Chemical (FIG. 1, the commercial 70/30 acrylate/maleate copolymer obtained from Alco Chemical (FIG. 2), and the 50/50 maleic/acrylic copolymer (copolymer 3, Table I) are shown in FIGS. 1–4.

Figure 2:
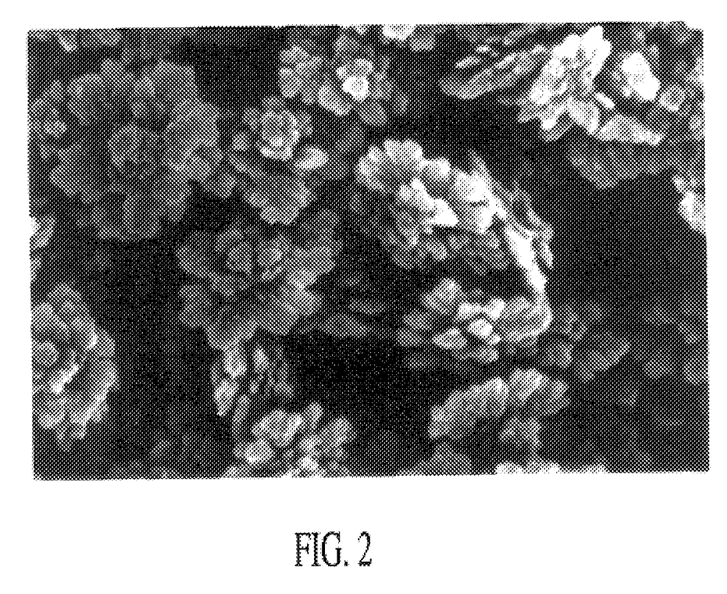
Figure 3:
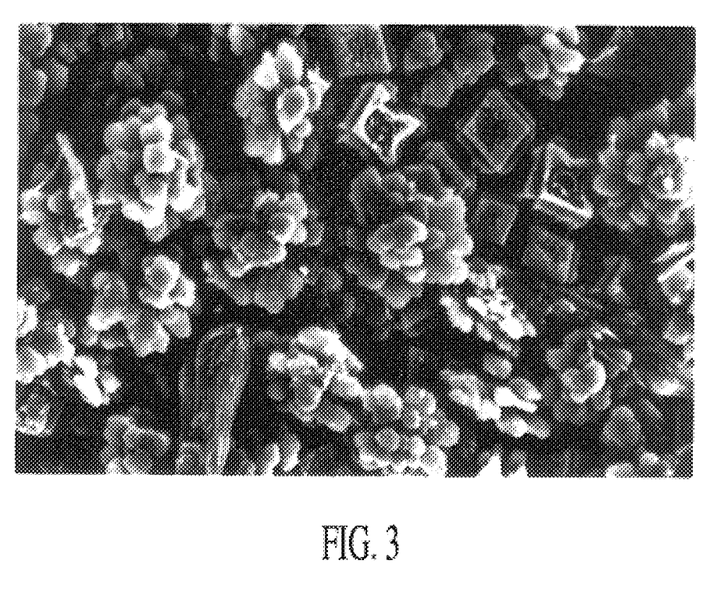
Figure 4:
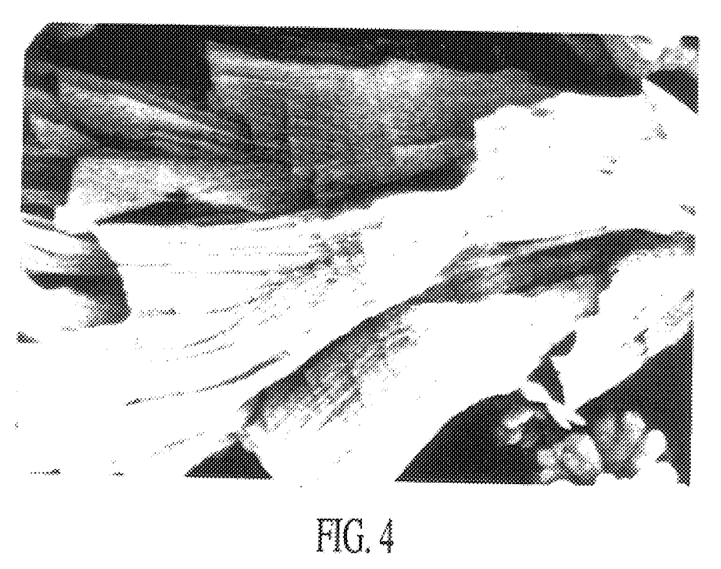

As can be seen by comparing FIG. 4 (copolymer 1A of this invention) with FIGS. 1 and 2, treatment of hard water with the copolymers of this invention significantly distorted crystal morphology, creating crystals having narrow points of attachment to nucleation sites. The small attachment site of these crystals is believed to create mechanical instability and, thereby, inhibit scale deposition. The control polymers did not modify crystal structure in this manner. The control crystals shown in FIGS. 1 and 2 exhibit traditional calcite and aragonite morphology with some distorted calcite and deformed aragonite morphology observed.

Stressed Calcium Carbonate Test

High electrolyte and high pH conditions were used to quantitatively test the copolymers of this invention for copolymer effects on calcium carbonate threshold inhibition, dispersancy and surface adhesion.

A series of samples containing 160 ppm Ca++ ions were prepared at each of three pH levels (9.2, 10.7 and 12.3), blanks were prepared without added polymer and test samples were treated with 0.2% solutions of active, experimental and control polymers (1 ml of solution=10 ppm polymer in sample).

To prepare the samples at pH 9.2, 20 mls of 0.2M $Na_2CO_3$ solution, 30 mls of a 0.2M $NaHCO_3$ solution and 50 mls of a 4.0M NaCl solution were added to a 250 ml erlenmeyer flask and, where indicated, polymer samples were added to the flasks. For pH 10.7 samples, 45 mls of 0.2M $NaCO_3$ solution and 5 mls of 0.2M $NaHCO_3$ solution were used. A 100 ml aliquot of a $CaCl_2$ 2 $H_2O$ aqueous solution (0.588 g/L) containing 160 ppm Ca++ ions was added to each flask. Flasks were stoppered and placed into a 50° C. water bath for 48 hours.

For the 12.3 pH samples, 50 mls of the 0.2M $NaCO_3$ solution was added to the flasks, polymer solutions were added and then 50 ml of a 4.0M NaCl solution containing 0.5M NaOH was added simultaneously with 100 ml of the $CaCl_2$ solution. Sample preparation was otherwise identical to that of the pH 9.2 and 10.7 samples.

Samples were divided into three parts to measure effects of polymer treatment on calcium carbonate solution properties: (1) filtrate aliquot, (2) membrane aliquot and (3) adherent aliquot. "Filtrate" aliquots contained calcium stabilized (inhibited) by the polymers. This is representative of the "threshold effect" of the polymer. "Membrane" aliquots contained solid material collected on a filter membrane. This is representative of "dispersing effect" of the polymers. "Adherent" aliquots contained material which had been attached to the surface of the sample flasks. This is representative of the effect of the polymer on the "adhesive" properties of formed crystals.

To separate samples into these aliquots, the samples were removed from the water bath and allowed to equilibrate to room temperature. Holding the stopper securely, the sample flask was gently inverted three times and immediately filtered through 0.45 μm membrane filters to prepare the "filtrate" aliquot. A total of 1 ml of 12% KCl and 5 mls from the side arm flask were pipetted into a 100 ml volumetric flask. An aliquot of 50 mls of 14% nitric acid was added and the flask was filled to volume with deionized water. (5 mls of the filtrate is equal to 1:20 dilution).

To prepare the "adherent" aliquot, 50 mls of 14% nitric acid was poured into the sample flask and swirled to dissolve crystals. The contents of the sample flask were transferred into a 100 ml volumetric flask and the sample flask was rinsed with 30 mls of deionized water while transferring into the volumetric flask. A total of 1 ml of 12% KCl was added to the volumetric and it was filled to the mark with deionized water.

To prepare the "membrane" aliquot, the filtration apparatus was transferred to another side-arm flask and 50 mls of 14% nitric acid was slowly poured through the filter membrane, and the membrane was rinsed with 20 mls of deionized water. The contents of the filtration flask containing the "membrane" aliquot were transferred into a 100 ml volumetric flask. The flask was rinsed with about 20 mls of deionized water while transferring into the volumetric flask, 1 ml of 12% KCl was added to the volumetric and it was filled to volume with deionized water. Samples were analyzed by flame atomic absorption spectrophotometry on a Perkin Elmer Model 5100 Atomic Absorption Spectrophotometer. Results reported in Table II are calculated as the percent of calcium in the sample aliquots.

TABLE II

Polymer Inhibition of Calcium Carbonate at High ph and High Electrolyte

| | | Percent Calcium | | |
|---|---|---|---|---|
| Polymer[a] (Mw) | Polymer Treatment Level mg/l | Adherent % | Membrane % | Filtrate % |
| Polyacrylate[c] (2,500) | 12 | 11.3 | 87.3 | 1.1 |
| | 18 | 6.9 | 92.6 | 0.2 |
| | 24 | 6.9 | 92.2 | 0.6 |
| | 30 | 7.3 | 91.9 | 0.5 |
| Acrylate/maleate[c] 70/30 | 12 | 21.7 | 18.4 | 59.5 |
| | 18 | 24.0 | 10.7 | 65.0 |

TABLE II-continued

Polymer Inhibition of Calcium Carbonate at High ph and High Electrolyte

| Polymer[a] (Mw) | Polymer Treatment Level mg/l | Adherent % | Membrane % | Filtrate % |
|---|---|---|---|---|
| (4,500) | 24 | 5.9 | 9.5 | 84.3 |
|  | 30 | 6.6 | 7.1 | 86.0 |
| Sokalan ® CP-5[b] | 12 | 34.6 | 29.1 | 36.2 |
| (18,599) | 18 | 34.7 | 9.1 | 56.1 |
|  | 24 | 20.0 | 17.7 | 62.2 |
|  | 30 | 14.1 | 17.8 | 68.0 |
| Sokalan ® CP-7[b] | 12 | 40.7 | 6.2 | 53.0 |
| (13,966) | 18 | 26.8 | 8.7 | 64.4 |
|  | 24 | 17.4 | 7.2 | 75.3 |
|  | 30 | 9.7 | 6.9 | 83.3 |
| Sokalan ® CP-45[b] | 12 | 41.6 | 13.9 | 44.4 |
| (22,850) | 18 | 32.8 | 16.7 | 50.4 |
|  | 24 | 37.1 | 8.8 | 54.1 |
|  | 30 | 22.9 | 8.8 | 68.2 |
| Copolymer 1A[d] | 12 | 20.9 | 4.6 | 74.3 |
| (2,600) | 18 | 10.6 | 3.4 | 85.7 |
| MA/AA/AM | 24 | 1.2 | 4.2 | 94.4 |
| 50/45/5 | 30 | 1.3 | 4.8 | 93.8 |
| Copolymer 3 | 12 | 19.2 | 11.4 | 69.2 |
| (2,672) | 18 | 12.1 | 6.4 | 81.3 |
| MA/AA | 24 | 8.5 | 6.9 | 84.4 |
| 50/50 | 30 | 3.5 | 12.2 | 84.1 |

[a]Experimental polymers are described in Table I and Example 1, above.
[b]Commercial acrylate polymers obtained from BASF Corporation, Parsippany, New Jersey.
[c]Commercial polymers obtained from Alco Chemical Company, Chattanooga, Tennessee.
[d]Copolymer 1A was prepared as described for copolymer 1 of Table I, except the initiator contained 10.8% hydrogen peroxide, 4.5% sodium persulfate and 5.6% ferrous ion, on a monomer weight basis.

In interpreting the data of Table II, it should be noted that the critical parameter is the percent adherent, i.e., the level of calcium carbonate which would adhere to the particular substrate of interest. The percent adherent should be as low as possible. It is preferred that the percent calcium carbonate in the filtrate be as high as possible to provide for efficient removal of calcium from the system before the calcium carbonate crystals are formed. However, the amount of calcium in the filtrate may be lower, provided that at the same time the percent calcium carbonate crystals retained on the membrane is higher, indicating greater dispersancy of formed crystals. The dispersed crystals may be removed via conventional means, which would be apparent to one skilled in the art of water treatment.

The results show that the copolymers of this invention comprising a nonionic monomer (e.g., acrylamide) provided better threshold inhibition, dispersancy and scale inhibition than a 50/50 molar ratio maleate/acrylate copolymer and the commercial polymer controls. The 50/50 molar ratio maleate/acrylate copolymer having a molecular weight of 2,672 showed acceptable levels of calcium carbonate inhibition and was superior to the commercial controls (i.e., acrylate/maleate at a weight of 4,500, the Sokalan polymers and polyacrylate). Such enhanced performance was observed under high electrolyte and pH conditions. Thus, the copolymers of this invention provide superior efficacy in controlling scale formation in water systems.

Example 3

The following additional polymers were prepared as above and tested for "stressed" calcium carbonate against a MA:AA:AM (50:45:5 mole %) (Copolymer 20) of the present invention. The data presented in Table III detail the ability of the polymer to inhibit calcium carbonate (filtrate), disperse calcium carbonate (membrane) and prevent adherent scale (adherent).

| Polymer | Monomer Ratio | Total Solids (%) | pH |
|---|---|---|---|
| Copolymer 21 | MA:AA:VA 50:45:5 mole % | 42.2 | 5.60 |
| Copolymer 22 | MA:AA:VA 65:30:5 mole % | 40.2 | 5.88 |
| Copolymer 23 | MA:AM 50:50 mole % | 40.3 | 7.47 |

| Treatment Level (mg/L) | % Filtrate | % Membrane | % Adherent |
|---|---|---|---|
| Polymer 20 | | | |
| 12.0 | 82.4 | 3.4 | 14.3 |
| 18.0 | 95.2 | 2.9 | 1.9 |
| 24.0 | 96.1 | 3.1 | 0.8 |
| 30.0 | 95.7 | 3.6 | 0.7 |
| Polymer 21 | | | |
| 12.0 | 74.5 | 3.6 | 21.9 |
| 18.0 | 85.7 | 3.6 | 10.8 |
| 24.0 | 93.2 | 4.6 | 2.2 |
| 30.0 | 94.1 | 5.2 | 0.7 |
| Polymer 22 | | | |
| 12.0 | 44.6 | 23.1 | 32.4 |
| 18.0 | 75.3 | 4.2 | 20.5 |
| 24.0 | 82.0 | 6.0 | 12.0 |
| 30.0 | 87.2 | 6.8 | 6.0 |
| Polymer 23 | | | |
| 12.0 | 80.0 | 3.4 | 16.6 |
| 18.0 | 94.4 | 2.1 | 3.5 |
| 24.0 | 96.9 | 2.5 | 0.7 |
| 30.0 | 96.8 | 2.4 | 0.8 |

Now that the preferred embodiments of the present invention have been described in detail, various modifications and improvements thereon will become readily apparent to one skilled in the art. Therefore, the scope and spirit of the invention are to be limited only by the claims, and not by the foregoing specification.

We claim:

1. A process for treating water in an aqueous system to inhibit scale formation including calcium carbonate and to sequester water-hardness ions therein, the method comprising contacting the water in the aqueous system with an amount of a maleate copolymer effective to inhibit scale formation and to sequester water-hardness ions in the aqueous system, the maleate copolymer having a weight average molecular weight of 1000 to 4,000, a residual total monomer content of less than 1%, on a maleate copolymer dry weight basis, and comprising from about 40 to about 70 mole percent of dicarboxylic functionality provided by a maleate monomer upon aqueous polymerization, from about 1 to about 15 mole percent of the polymerized residue of a non-ionic monomer selected from the group consisting of acrylamide, methacrylamide, ethylacrylamide, propylacrylamide, isopropylacrylamide, N,N-dimethylacrylamide, N,N-diethylacrylamide, N,N-dipropylacrylamide, N-methylolacrylamide, and t-butylacrylamide, and from about 20 to about 50 mole percent of a monomer selected from the group consisting of acrylic acid, methacrylic acid, ethacrylic acid, and combinations thereof, provided that at least 70 mole percent of the carboxylic acid charge on the maleate monomer is neutralized prior to polymerization.

2. The process of claim 1 wherein the maleate copolymer is prepared with from about 40 to about 70 mole percent of the maleate monomer, from about 1 to about 15 mole percent acrylamide, and from about 20 to about 50 mole percent of an acrylic acid.

* * * * *